(12) United States Patent
Kurita et al.

(10) Patent No.: US 7,935,023 B2
(45) Date of Patent: May 3, 2011

(54) TRANSMISSION DEVICE AND CONTROL METHOD FOR CONTINUOUSLY VARIABLE TRANSMISSION

(75) Inventors: Kiyoshi Kurita, Anjo (JP); Fumihiro Hazu, Anjo (JP)

(73) Assignee: Aisin AW Co., Ltd., Tokyo (JP)

( * ) Notice: Subject to any disclaimer, the term of this patent is extended or adjusted under 35 U.S.C. 154(b) by 543 days.

(21) Appl. No.: 12/138,832

(22) Filed: Jun. 13, 2008

(65) Prior Publication Data
US 2008/0312030 A1   Dec. 18, 2008

(30) Foreign Application Priority Data

Jun. 15, 2007   (JP) .................................. 2007-158890

(51) Int. Cl.
*F16H 61/662* (2006.01)
(52) U.S. Cl. ................. 477/46; 477/49; 477/50
(58) Field of Classification Search .............. 477/44–46, 477/49, 50
See application file for complete search history.

(56) References Cited

U.S. PATENT DOCUMENTS

| | | | |
|---|---|---|---|
| 5,088,355 A | 2/1992 | Sugaya et al. | |
| 6,007,452 A | 12/1999 | Sawada et al. | |
| 6,716,128 B2 * | 4/2004 | Kuramoto et al. | 475/207 |
| 6,813,551 B2 * | 11/2004 | Taniguchi et al. | 701/59 |
| 2002/0094904 A1 * | 7/2002 | Kuramoto et al. | 475/207 |
| 2008/0153665 A1 * | 6/2008 | Uchiyama | 477/49 |

FOREIGN PATENT DOCUMENTS

| | | |
|---|---|---|
| DE | 69017634 T2 | 7/1995 |
| EP | 0890763 A2 | 1/1999 |
| JP | 63-275847 A | 11/1988 |
| JP | 4-203664 A | 7/1992 |
| JP | 11-30321 A | 2/1999 |
| JP | 2001-146960 A | 5/2001 |
| JP | 2001-214970 A | 8/2001 |
| JP | 2001-324007 | 11/2001 |
| JP | 2002-181177 A | 6/2002 |
| JP | 2003-130193 A | 5/2003 |
| JP | 2005-42808 A | 2/2005 |
| JP | 2005-112430 A | 4/2005 |
| JP | 2005-172011 A | 6/2005 |

OTHER PUBLICATIONS

"Bosch: Elektronische Getriebesteuerung EGS", Mar. 1, 2004, pp. 22-26, 1st edition, Plochingen, The Bosch Yellow Jackets Edition 2004, English language translation.

* cited by examiner

*Primary Examiner* — Ha D. Ho
(74) *Attorney, Agent, or Firm* — Sughrue Mion, PLLC (57) ABSTRACT

In the case where a belt return of a continuously variable transmission is not determined when the vehicle speed has become equal to or lower than a threshold value, control that causes a hydraulic actuator to have an intermediate pressure by setting a duty of a duty solenoid based on an input torque and an oil temperature and closing control are repeatedly performed, in accordance with the running and the stopping of the vehicle. As a result, it is possible to inhibit the continuously variable transmission from being shifted up due to a gradual increase in the hydraulic pressure in the hydraulic actuator caused by a line pressure seeping to the hydraulic actuator side through a small clearance in a spool of a flow rate control valve in a hydraulic circuit, and it is also possible to allow the continuously variable transmission to be shifted down.

12 Claims, 4 Drawing Sheets

TRANSMISSION DEVICE AND CONTROL METHOD FOR CONTINUOUSLY VARIABLE TRANSMISSION

CROSS REFERENCE TO RELATED APPLICATION

The disclosure of Japanese Patent Application No. 2007-158890 filed on Jun. 15, 2007 including the specification, drawings and abstract is incorporated herein by reference in its entirety.

BACKGROUND OF THE INVENTION

1. Field of the Invention

The present invention relates to a transmission device and a control method for a continuously variable transmission. More specifically, the present invention relates to a transmission device including a continuously variable transmission that is installed in a vehicle and that is shifted up by supplying a working fluid to a working fluid chamber and that is shifted down by discharging the working fluid from the working fluid chamber. The present invention also relates to a control method for such a continuously variable transmission.

2. Description of the Related Art

As an example of this type of transmission device, a transmission device including a belt type continuously variable transmission that is installed in a vehicle and driven by hydraulic pressure has been proposed. In this known transmission device, when the vehicle is not running at a low-speed that is equal to or lower than a predetermined vehicle speed, feedback control is performed on the gear ratio of the continuously variable transmission based on a deviation between the actual number of revolutions of a predetermined revolving member and a target revolution number, whereas when the vehicle is running at a low speed, the feedback control is inhibited and also closing control is performed on the hydraulic circuit so that the gear ratio of the continuously variable transmission does not change (see, for example, Japanese Patent Application Publication No. JP-A-2001-324007).

In the transmission device described above, when the vehicle is running at a low-speed, the closing control is performed so that the gear ratio of the continuously variable transmission does not change. However, over the course of time, there is a possibility that the gear ratio of the continuously variable transmission may gradually change because oil seeps through a small gap in a valve in the hydraulic circuit. In the case where, for example, the gear ratio of the continuously variable transmission has changed in the upshift direction, because the reduction gear ratio has become smaller, even if the driver depresses the accelerator pedal, only a small amount of driving force is output. Thus, there is a possibility that acceleration performance when the vehicle starts moving may be degraded.

SUMMARY OF THE INVENTION

An object of a transmission device and a control method for a continuously variable transmission according to the present invention is to inhibit acceleration performance from being degraded when the vehicle starts moving from a low-speed state.

To achieve the object described above, the transmission device and the control method for a continuously variable transmission according to the present invention are configured as described below.

The transmission device according to an aspect of the present invention includes: a continuously variable transmission that is installed in a vehicle and that is shifted up by supplying a working fluid to a working fluid chamber and that is shifted down by discharging the working fluid from the working fluid chamber; a fluid supplying and discharging unit that supplies and discharges the working fluid to and from the working fluid chamber; and a control unit that controls the fluid supplying and discharging unit such that, while the vehicle is in a low-speed state in which a speed of the vehicle is equal to or lower than a predetermined speed, a pressure of the working fluid in the working fluid chamber is at an intermediate pressure that is lower than a pressure when the speed of the vehicle has reached the predetermined speed and that is higher than a pressure when the working fluid has completely been discharged from the working fluid chamber.

In the transmission device according to an aspect of the present invention, the supply and the discharge of the working fluid to and from the working fluid chamber is controlled such that, while the vehicle is in the low-speed state in which the speed of the vehicle is equal to or lower than the predetermined speed, the pressure of the working fluid in the working fluid chamber is at the intermediate pressure that is lower than the pressure when the speed of the vehicle has reached the predetermined speed and that is higher than the pressure when the working fluid has completely been discharged from the working fluid chamber. In other words, because the pressure of the working fluid in the working fluid chamber is controlled to be lower than the pressure when the speed of the vehicle has reached the predetermined speed, it is possible to inhibit the continuously variable transmission from being shifted up due to an increase in the pressure of the working fluid in the working fluid chamber caused by the working fluid seeping through a small gap in a valve or the like. As a result, it is possible to inhibit acceleration performance from being degraded when the vehicle starts moving from the low-speed state. Also, depending on the level of the intermediate pressure, it is possible to allow the continuously variable transmission to be shifted down. In this situation, it is preferable that the intermediate pressure corresponds to a pressure at a certain level such as 90%, 80%, or 70% of the pressure of the working fluid in the working fluid chamber when the speed of the vehicle has reached the predetermined speed, in consideration of the output of the driving force when, at a later time, the driver depresses the accelerator pedal. As the continuously variable transmission, a belt type continuously variable transmission may be used. Further, as the working fluid, oil may be used.

In the transmission device according to an aspect of the present invention, the control unit may control the fluid supplying and discharging unit such that, while the vehicle is running in the low-speed state, the pressure of the working fluid in the working fluid chamber is reduced by discharging the working fluid from the working fluid chamber. The reason why the pressure of the working fluid in the working fluid chamber is reduced while the vehicle is running is that it is easy to shift down the continuously variable transmission, because the continuously variable transmission is also operating while the vehicle is running.

In the transmission device according to an aspect of the present invention, the fluid supplying and discharging unit may include a discharging solenoid valve that functions in such a manner that the higher a duty ratio of an electric current applied thereto is, the more the discharging solenoid valve facilitates the discharging of the working fluid from the working fluid chamber. The control unit may control the fluid supplying and discharging unit such that, while the vehicle is in the low-speed state, the electric current is applied to the discharging solenoid valve in such a manner that the larger a torque input to the continuously variable transmission is, the smaller the duty ratio is. The reason is that, if the torque that is input to the continuously variable transmission is large, the torque that is output as a result of shifting is also large, and it is therefore necessary to keep the pressure of the working fluid in the working fluid chamber, which is necessary to transfer torque, at a certain level. Thus, it is possible to output the input torque after effectively shifting the torque.

Further, in the transmission device according to an aspect of the present invention, the fluid supplying and discharging unit may include a discharging solenoid valve that functions in such a manner that the higher a duty ratio of an electric current applied thereto is, the more the discharging solenoid valve facilitates the discharging of the working fluid from the working fluid chamber. The control unit may control the fluid supplying and discharging unit such that, while the vehicle is in the low-speed state, the electric current is applied to the discharging solenoid valve in such a manner that the higher a temperature of the working fluid is, the smaller the duty ratio is. Generally, when the temperature of a working fluid becomes high, the viscosity of the working fluid becomes lower. Therefore, by applying the electric current to the discharging solenoid valve in such a manner that the higher the temperature of the working fluid is, the smaller the duty ratio is, it is possible to ensure that the pressure in the working fluid chamber is not reduced too much. Thus, it is possible to regulate the pressure in the working fluid chamber more properly.

Further, in the transmission device according to an aspect of the present invention, the control unit may control the fluid supplying and discharging unit such that, in a case where a gear ratio of the continuously variable transmission is determined to be a maximum reduction ratio when the vehicle has come into the low-speed state, the working fluid is discharged from the working fluid chamber regardless of the pressure of the working fluid in the working fluid chamber. Thus, it is possible to maintain the continuously variable transmission at the maximum reduction ratio.

The control method for a continuously variable transmission according to an aspect of the present invention is a control method for a continuously variable transmission that is installed in a vehicle and that is shifted up by supplying a working fluid to a working fluid chamber and that is shifted down by discharging the working fluid from the working fluid chamber. The control method includes the step of controlling supply and discharge of the working fluid to and from the working fluid chamber such that, while the vehicle is in a low-speed state in which a speed of the vehicle is equal to or lower than a predetermined speed, a pressure of the working fluid in the working fluid chamber is at an intermediate pressure that is lower than a pressure when the speed of the vehicle has reached the predetermined speed and that is higher than a pressure when the working fluid has completely been discharged from the working fluid chamber.

In the control method for the continuously variable transmission according to an aspect of the present invention, the supply and the discharge of the working fluid to and from the working fluid chamber is controlled such that, while the vehicle is in the low-speed state in which the speed of the vehicle is equal to or lower than the predetermined speed, the pressure of the working fluid in the working fluid chamber is at the intermediate pressure that is lower than the pressure when the speed of the vehicle has reached the predetermined speed and that is higher than the pressure when the working fluid has completely been discharged from the working fluid chamber. In other words, because the pressure of the working fluid in the working fluid chamber is controlled to be lower than the pressure when the speed of the vehicle has reached the predetermined speed, it is possible to inhibit the continuously variable transmission from being shifted up due to an increase in the pressure of the working fluid in the working fluid chamber caused by the working fluid seeping through a small gap in a valve or the like. Also, depending on the level of the intermediate pressure, it is possible to allow the continuously variable transmission to be shifted down. In this situation, it is preferable that the intermediate pressure corresponds to a pressure at a certain level such as 90%, 80%, or 70% of the pressure of the working fluid in the working fluid chamber when the speed of the vehicle has reached the predetermined speed, in consideration of the output of the driving force when, at a later time, the driver depresses the accelerator pedal. As the continuously variable transmission, a belt type continuously variable transmission may be used. Further, as the working fluid, oil may be used.

DETAILED DESCRIPTION OF THE EXEMPLARY EMBODIMENTS

Figure 1:
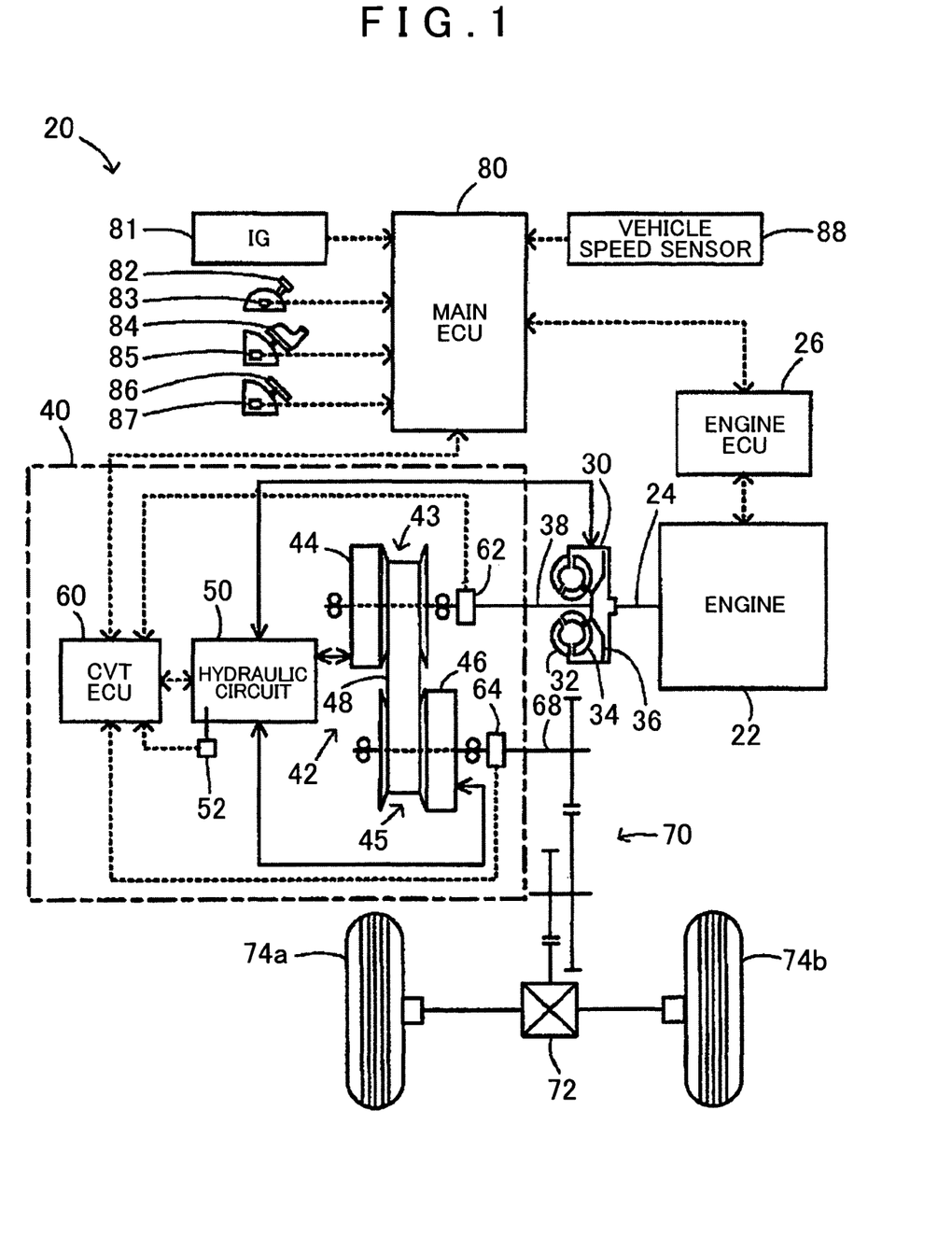
FIG. 1 is a configuration diagram that schematically shows a configuration of an automobile 20 in which a transmission device 40 according to an embodiment of the present invention is installed.

A preferred embodiment of the present invention will be explained through exemplary embodiments. FIG. 1 is a configuration diagram that schematically shows a configuration of an automobile 20 in which a transmission device 40 according to an embodiment of the present invention is installed. The automobile 20 according to the present embodiment includes an engine 22, a torque converter 30, a transmission device 40, and a main electronic control unit (hereinafter, simply referred to as the "main ECU") 80. The torque converter 30 includes a lock-up mechanism and is attached, via a damper (not shown in the drawing), to a crankshaft 24, which is an output shaft of the engine 22. The transmission device 40 is connected to an input shaft 38, which is an output shaft of the torque converter 30, and to an output shaft 68, which is connected to drive wheels 74a and 74b via a differential gear 72 and a gear mechanism 70, and that, in principle, outputs the power to the output shaft 68 after continuously changing the speed of the power from the input shaft 38 side. The main ECU 80 performs control over the entire vehicle.

The engine 22 is structured as an internal combustion engine that outputs power by using a hydrocarbon-based fuel such as gasoline or gas oil. The engine 22 is controlled by an engine electronic control unit (hereinafter, the "engine ECU") 26 that performs fuel injection control, ignition control, intake air amount adjustment control based on signals from various types of sensors that detect the state of the engine 22. The signals include a crank position signal from a crank position sensor (not shown in the drawing) that is attached to the crankshaft 24. The engine ECU 26 is operable to communicate with the main ECU 80 so as to control the operation of the engine 22 according to a control signal from the main ECU 80 and also outputs, as necessary, data related to the operation state of the engine 22 to the main ECU 80.

The torque converter 30 is structured as a fluid torque converter that includes a well-known lock-up clutch. By using a lock-up clutch 36, the torque converter 30 locks up, as necessary, a turbine runner 32 connected to the crankshaft 24 of the engine 22 and a pump impeller 34 connected to the input shaft 38 of the transmission device 40. The lock-up clutch 36 used by the torque converter 30 is operated by a hydraulic circuit 50 that is controlled and driven by a continuously variable transmission electronic control unit (hereinafter, the "CVTECU") 60, which is explained later.

The transmission device 40 includes a belt type continuously variable transmission 42, the hydraulic circuit 50 that drives the continuously variable transmission 42; and the CVTECU 60 that controls and drives the hydraulic circuit 50. The belt type continuously variable transmission 42 is connected to the input shaft 38 and the output shaft 68 and, in principle, outputs power to the output shaft 68 side after continuously changing the speed of the power from the input shaft 38 side.

The continuously variable transmission 42 includes a primary pulley 43, a secondary pulley 45, hydraulic actuators 44 and 46, and a belt 48. The primary pulley 43 is configured so that the width of the groove is changeable and is connected to the input shaft 38. The secondary pulley 45 is also configured so that the width of the groove is changeable and is connected to the output shaft 68 that serves as a drive shaft. The hydraulic actuators 44 and 46 change the width of the grooves of the primary pulley 43 and the secondary pulley 45. The belt 48 is wound around the primary pulley 43 and the secondary pulley 45 to be placed in the grooves thereof. By driving the hydraulic actuators 44 and 46 so as to change the width of each of the grooves of the primary pulley 43 and the secondary pulley 45, the continuously variable transmission 42 outputs power to the output shaft 68 after continuously changing the speed of the power from the input shaft 38. The width of each of the grooves of the primary pulley 43 and the secondary pulley 45 is changed not only to change the gear ratio as explained above, but also to control the nip pressure of the belt 48 used for adjusting the transmission torque capacity of the continuously variable transmission 42.

Figure 2:
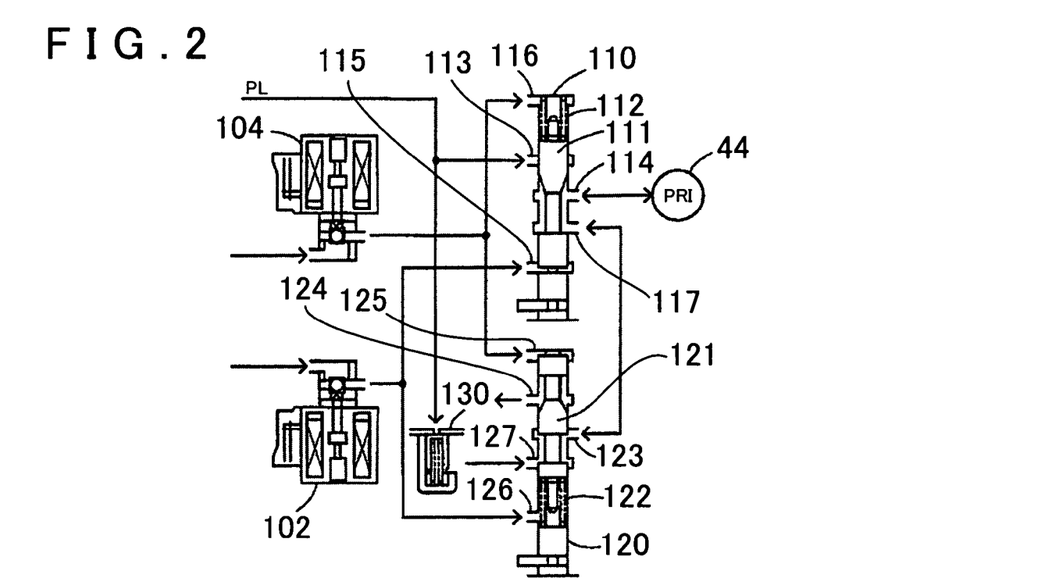
FIG. 2 is a configuration diagram that shows an example of a hydraulic circuit connected to a hydraulic actuator 44 for a primary pulley 43.

The hydraulic circuit 50 serves as a circuit connected to the hydraulic actuator 44 of the primary pulley 43. As shown in FIG. 2 as an example, the hydraulic circuit 50 includes duty solenoids 102 and 104, a first flow rate control valve 110, a second flow rate control valve 120, and a pressure reducing mechanism 130. The duty solenoids 102 and 104 adjust the amount of oil. The first flow rate control valve 110 performs an upshift by supplying a line pressure PL to the hydraulic actuator 44 of the primary pulley 43. The second flow rate control valve 120 performs a downshift by discharging the oil in the hydraulic actuator 44 into a drain. The pressure reducing mechanism 130 supplies the line pressure PL to the hydraulic actuator 44 after slightly reducing the pressure thereof so that the hydraulic pressure in the hydraulic actuator 44 does not decrease when a so-called closing control is performed by setting the duty of both of the duty solenoids 102 and 104 to 0%. The line pressure PL is supplied after the pressure thereof is regulated by a pressure applied from an oil pump (not shown in the drawing) that is attached to the crankshaft 24 of the engine 22 to be driven.

The first flow rate control valve 110 includes a spool 111, an input port 113, an output port 114, a spring 112, an opening port 115, a closing port 116, and a communication port 117. The spool 111 opens and closes a flow path formed between the input port 113, through which the line pressure PL is supplied, and the output port 114 communicates with the hydraulic actuator 44 of the primary pulley 43. The spring 112 biases the spool 111 in a direction to close the flow path formed between the input port 113 and the output port 114 (i.e., the direction toward the bottom of FIG. 2). The opening port 115 receives oil from the duty solenoid 102 so as to move the spool 111 in a direction to open the flow path formed between the input port 113 and the output port 114 (i.e., the direction toward the top of FIG. 2). The closing port 116 receives oil from the duty solenoid 104 so as to move the spool 111 in a direction to close the flow path formed between the input port 113 and the output port 114 (i.e., the direction toward the bottom of FIG. 2). The communication port 117 communicates with the output port 114 and also communicates with the second flow rate control valve 120. By making the duty of the duty solenoid 102 higher and supplying the oil from the duty solenoid 102 to the opening port 115, the first flow rate control valve 110 that is structured as described above causes the flow path formed between the input port 113 and the output port 114 to open by moving the spool 111 in the direction toward the top of FIG. 2, so that the line pressure PL is communicated to the hydraulic actuator 44. As a result, the oil is supplied to the hydraulic actuator 44 so that the width of the groove of the primary pulley 43 becomes smaller, and the continuously variable transmission 42 is shifted up.

The second flow rate control valve 120 includes a spool 121, a communication port 123, a drain port 124, a spring 122, an opening port 125, a closing port 126, and a pressure regulating port 127. The spool 121 opens and closes the flow path formed between the communication port 123, which communicates with the communication port 117 in the first flow rate control valve 110, and the drain port 124, which communicates with a drain. The spring 122 biases the spool 121 in a direction to close the flow path formed between the communication port 123 and the drain port 124 (i.e., the direction toward the top of FIG. 2). The opening port 125 receives oil from the duty solenoid 104 so as to move the spool 121 in a direction to open the flow path formed between the communication port 123 and the drain port 124 (i.e., the direction toward the bottom of FIG. 2). The closing port 126 receives oil from the duty solenoid 102 so as to move the spool 121 in a direction to close the flow path formed between the communication port 123 and the drain port 124 (i.e., the direction toward the top of FIG. 2). The pressure regulating port 127 communicates with the communication port 123 while the flow path formed between the communication port 123 and the drain port 124 is closed, and regulates the hydraulic pressure by supplying the hydraulic pressure from the pressure reducing mechanism 130 to the first flow rate control valve 110 side. By making the duty of the duty solenoid 104 higher and supplying the oil from the duty solenoid 104 to the opening port 125, the second flow rate control valve 120 that is structured as described above causes the flow path formed between the communication port 123 and the drain port 124 to open by moving the spool 121 in the direction toward the bottom of FIG. 2, so that the hydraulic actuator 44 is communicated with the drain port 124, via the output port 114 and the communication port 117 in the first flow rate control valve 110 and the communication port 123 in the second flow rate control valve 120. As a result, the oil is discharged from the hydraulic actuator 44 so that the width of the groove of the primary pulley 43 becomes larger, and the continuously variable transmission 42 is shifted down.

Although not shown in the drawings in detail, the CVTECU 60 is structured as a microprocessor that includes a CPU as the core thereof. In addition to the CPU, the CVTECU 60 includes a ROM that stores therein a processing program; a RAM that temporarily stores data therein; input output ports; and a communication port. The CVTECU 60 receives, via an input port, an input of the number of revolutions Nin of the input shaft 38 from a revolution speed sensor 62 attached to the input shaft 38, an input of the number of revolutions Nout of the output shaft 68 from a revolution speed sensor 64 attached to the output shaft 68, an input of the oil temperature Toil from a temperature sensor 52 that detects the temperature of the oil serving as a working fluid in the hydraulic circuit 50, and the like. The CVTECU 60 outputs, via an output port, a driving signal to the hydraulic circuit 50. Also, the CVTECU 60 is operable to communicate with the main ECU 80. According to a control signal from the main ECU 80, the CVTECU 60 controls the gear ratio of the continuously variable transmission 42 and also outputs, as necessary, data related to the operation state of the continuously variable transmission 42 to the main ECU 80, the data including the number of revolutions Nin of the input shaft 38 received from the revolution speed sensor 62 and the number of revolutions Nout of the output shaft 68 received from the revolution speed sensor 64.

Although not shown in the drawings in detail, the main ECU 80 is structured as a microprocessor that includes a CPU as the core thereof, like the CVTECU 60. In addition to the CPU, the main ECU 80 includes a ROM that stores therein a processing program; a RAM that temporarily stores data therein; input output ports; and a communication port. The main ECU 80 receives, via an input port, an input of an ignition signal from an ignition switch 81, an input of a shift position SP from a shift position sensor 83 that detects an operation position of a shift lever 82, an input of an accelerator opening degree Acc from an accelerator pedal position sensor 85 that detects the depression amount of an accelerator pedal 84, an input of a brake pedal position BP from a brake pedal position sensor 87 that detects the depression amount of a brake pedal 86, an input of a vehicle speed V from a vehicle speed sensor 88, and the like. Also, the main CPU 80 is operable to communicate with the engine ECU 26 and the CVTECU 60 and to exchange various types of control signals and data with the engine ECU 26 and the CVTECU 60.

The automobile 20 according to the present embodiment that is structured as described above basically calculates the driving force that is necessary for driving the vehicle, based on the depression amount of the accelerator pedal 84 by the driver and the vehicle speed V. The automobile 20 then calculates an operation point of the engine 22 that allows the calculated driving force to be output efficiently and sets a target revolution number Nin* of the input shaft 38 so that the engine 22 is operated at the calculated operation point. The automobile 20 runs while shift control is performed on the gear ratio of the continuously variable transmission 42 by the CVTECU 60 so that the number of revolutions Nin of the input shaft 38 becomes equal to the target revolution number Nin*. Also, the automobile 20 runs while the intake air amount and the fuel injection amount of the engine 22 are controlled by the engine ECU 26 so that the calculated driving force is output from the engine 22.

Figure 3:
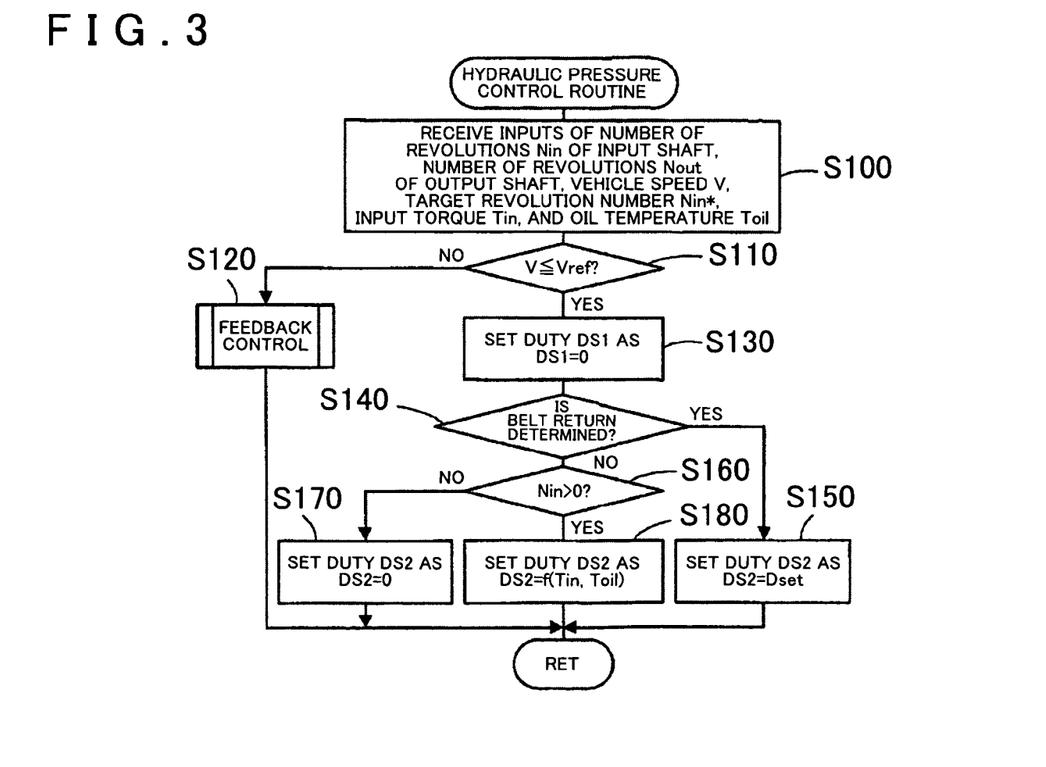
FIG. 3 is a flowchart of an example of a hydraulic pressure control routine performed by a CVTECU 60.

Next, an operation of the transmission device 40 according to the present embodiment will be explained. In particular, an operation of the transmission device 40 when the vehicle is in a low-speed state in which the vehicle speed V is equal to or lower than a threshold value Vref (e.g., 2 km/h or 3 km/h) will be explained. FIG. 3 is a flowchart of an example of a hydraulic pressure control routine performed on the hydraulic actuator 44 by the CVTECU 60. The routine is repeatedly performed at predetermined intervals (e.g., every few milliseconds).

When the hydraulic pressure control routine is performed, first, the CPU (not shown in the drawings) of the CVTECU 60 performs a process to receive inputs of the data that is necessary for performing control such as the number of revolutions Nin of the input shaft 38 from the revolution speed sensor 62, the number of revolutions Nout of the output shaft 68 from the revolution speed sensor 64, the vehicle speed V, the target revolution number Nin* of the input shaft 38, an input torque Tin that is input to the input shaft 38, the oil temperature Toil from the temperature sensor 52, and the like (operation S100). In this situation, as for the vehicle speed V, the one that has been detected by the vehicle speed sensor 88 is input from the main ECU 80 via communication. As for the target revolution number Nin* and the input torque Tin of the input shaft 38, those that have been calculated by the main ECU 80 are input via communication.

When having received the inputs of data, the CVTECU 60 determines whether or not the vehicle speed V is equal to or lower than the threshold value Vref (e.g., 2 km/h or 3 km/h) (operation S110). In the case where the vehicle speed V is higher than the threshold value Vref, the CVTECU 60 causes the continuously variable transmission 42 to be shifted up or shifted down by performing feedback control so as to counteract the deviation between the target revolution number Nin* of the input shaft 38 and the number of revolutions Nin of the input shaft 38 (operation S120), and the routine ends. Because the feedback control is not the focus of the present invention, further explanation thereof will be omitted.

In the case where the vehicle speed is equal to or lower than the threshold value Vref, the duty solenoid 102 is operated by setting a duty DS1 of the duty solenoid 102 to 0% (operation S130) and determines whether or not the belt of the continuously variable transmission 42 has returned (operation S140). The determination on the belt return of the continuously variable transmission 42 is performed by determining whether or not the continuously variable transmission 42 has been shifted down until the maximum reduction ratio is achieved. For example, it is determined that the belt has returned, if all of the following conditions are satisfied: the gear ratio of the continuously variable transmission 42 is equal to or higher than a threshold value set as a value close to the maximum reduction ratio; the shift control performed by the continuously variable transmission 42 immediately before the vehicle speed V has become equal to or lower than the threshold value Vref is a downshift; and the vehicle speed V is equal to or lower than a threshold value V2, which is lower than the threshold value Vref. When it is determined that the belt has returned based on these conditions, because the continuously variable transmission 42 has been shifted down until the maximum reduction ratio is achieved, the CVTECU 60 determines that there is no need to maintain the hydraulic pressure in the hydraulic actuator 44. Thus, the CVTECU 60 sets a duty DS2 of the duty solenoid 104 to a set value Dset (e.g., 70%, 80%, or the like) so as to discharge the oil from the hydraulic actuator 44 and to cause the duty solenoid 104 to operate (operation S150). Thus, the routine ends. When the duty solenoid 104 is operated in this manner, because the oil from the duty solenoid 104 is supplied to the closing port 126, the spool 121 included in the second flow rate control valve 120 is pressed down toward the bottom of FIG. 2. As a result, the flow path formed between the communication port 123 and the drain port 124 is opened. Consequently, the oil in the hydraulic actuator 44 is discharged into the drain via the output port 114 and the communication port 117 in the first flow rate control valve 110, and the communication port 123 and the drain port 124 in the second flow rate control valve 120. Thus, the continuously variable transmission 42 is stably maintained in the state where the maximum reduction ratio is achieved.

On the other hand, in the case where it is determined that the belt of the continuously variable transmission 42 has not returned, in other words, in the case where it is determined that the continuously variable transmission 42 has not shifted down until the maximum reduction ratio is achieved, the CVTECU 60 determines whether the value of the number of revolutions Nin of the input shaft 38 is "0" or not (operation S160). In the case where the value of the number of revolutions Nin is "0", the CVTECU 60 determines that the continuously variable transmission 42 cannot be shifted because the vehicle is stopped and therefore causes the duty solenoid 104 to operate by setting the duty DS2 of the duty solenoid 104 to 0% (operation S170). Thus, the routine ends. In this situation, the so-called closing control is performed such that the hydraulic pressure in the hydraulic actuator 44 is maintained by setting the duty of both the duty solenoid 102 and the duty solenoid 104 to 0%.

Figure 4:
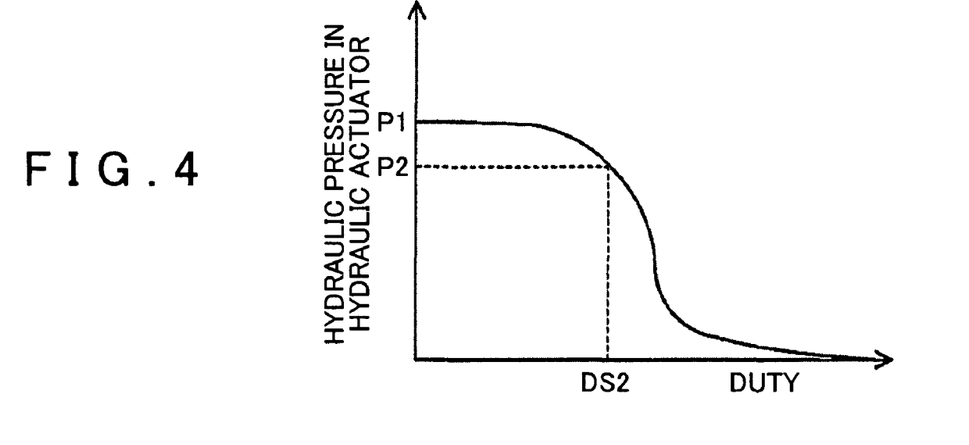
FIG. 4 is a drawing for explaining an example of a relationship between the hydraulic pressure in the hydraulic actuator 44 and a duty DS2 of a duty solenoid 104.
Figure 5:
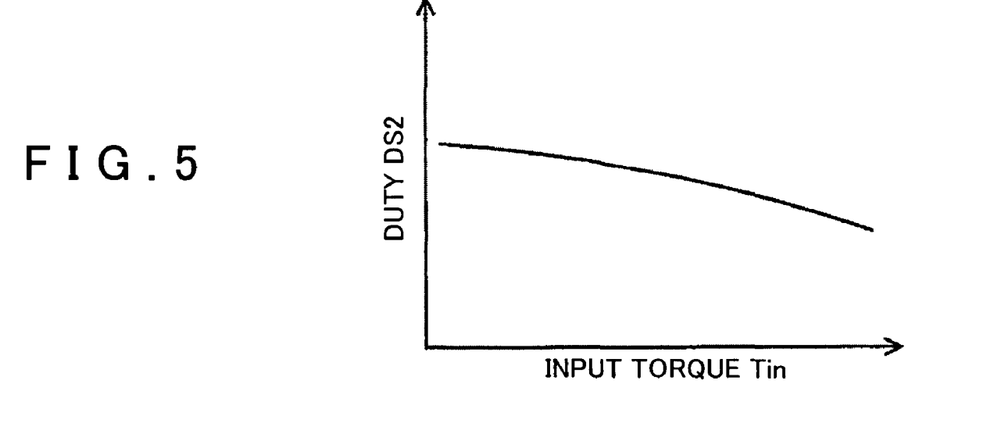
FIG. 5 is a drawing for explaining an example of a relationship between an input torque Tin and the duty DS2 of the duty solenoid 104.
Figure 6:
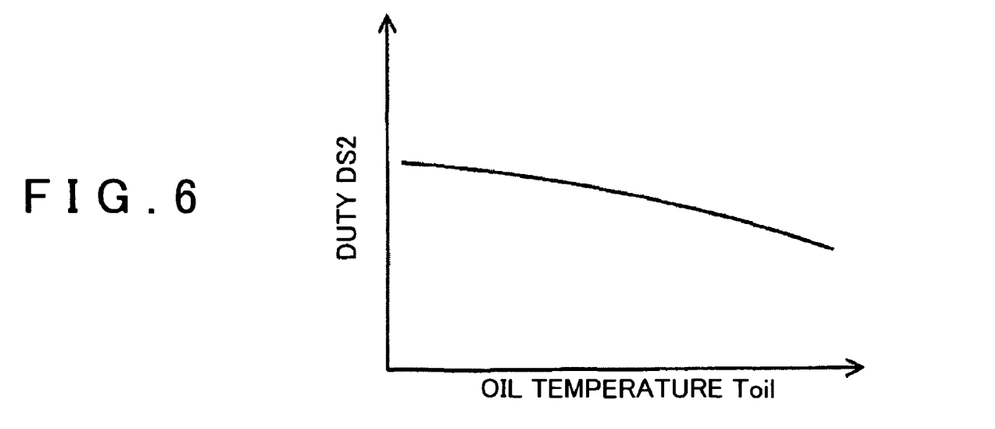
FIG. 6 is a drawing for explaining an example of a relationship between an oil temperature Toil and the duty DS2 of the duty solenoid 104.

In the case where it is determined at operation S160 that the value of the number of revolutions Nin of the input shaft 38 is not "0", the CVTECU 60 causes the duty solenoid 104 to operate by setting the duty DS2 of the duty solenoid 104 to a value based on the input torque Tin and the oil temperature Toil (operation S180). Thus, the routine ends. FIG. 4 is a drawing of an example of the relationship between the hydraulic pressure in the hydraulic actuator 44 and the duty DS2 of the duty solenoid 104. In FIG. 4, P1 denotes the hydraulic pressure in the hydraulic actuator 44 when the vehicle speed V has become equal to or lower than the threshold value Vref. P2 denotes the hydraulic pressure in the hydraulic actuator 44 when the duty solenoid 104 is operated with the duty DS2. In the present embodiment, P2 is approximately 70% to 90% of P1. The duty DS2 is approximately 30% to 50%, although it depends on the configurations of the second flow rate control valve 120 and the duty solenoid 104. The hydraulic pressure in the hydraulic actuator 44 is set to a hydraulic pressure that is lower than the hydraulic pressure when the vehicle speed V has become equal to or lower than the threshold value Vref, but is kept at a certain level, for the following purposes: to inhibit the continuously variable transmission 42 from being shifted up due to a gradual increase in the hydraulic pressure in the hydraulic actuator 44 caused by the line pressure PL seeping to the hydraulic actuator 44 side through a small clearance in the spool 111 of the first flow rate control valve 110 while the closing control is performed by setting the duty of both of the duty solenoids 102 and 104 to 0%, and to allow the continuously variable transmission 42 to be shifted down; and also, to maintain the nip pressure of the belt 48 when the accelerator pedal 84 is depressed and the driving force is output. In the present embodiment, in order to set the duty DS2 of the duty solenoid 104, the relationship among the input torque Tin, the oil temperature Toil, and the duty DS2 of the duty solenoid 104 is determined in advance and stored into the CVTECU 60 in the form of a duty setting map, so that a corresponding value of the duty DS2 is derived from the map when a value of the input torque Tin and a value of the temperature Toil are specified. An example of the relationship between the input torque Tin and the duty DS2 of the duty solenoid 104 is shown in FIG. 5. Also, an example of the relationship between the oil temperature Toil and the duty DS2 of the duty solenoid 104 is shown in FIG. 6. As shown in these drawings, the duty DS2 is set in such a manner that the larger the input torque Tin is, the smaller the duty DS2 of the duty solenoid 104 tends to be, and also, in such a manner that the higher the oil temperature Toil is, the smaller the duty DS2 of the duty solenoid 104 tends to be. This is based on the following reason. Because the nip pressure of the belt 48 should be maintained, the larger the input torque Tin is, the higher the hydraulic pressure in the hydraulic actuator 44 needs to be held, and the higher the oil temperature Toil is, the more easily the oil in the hydraulic actuator 44 is discharged.

Figure 7:
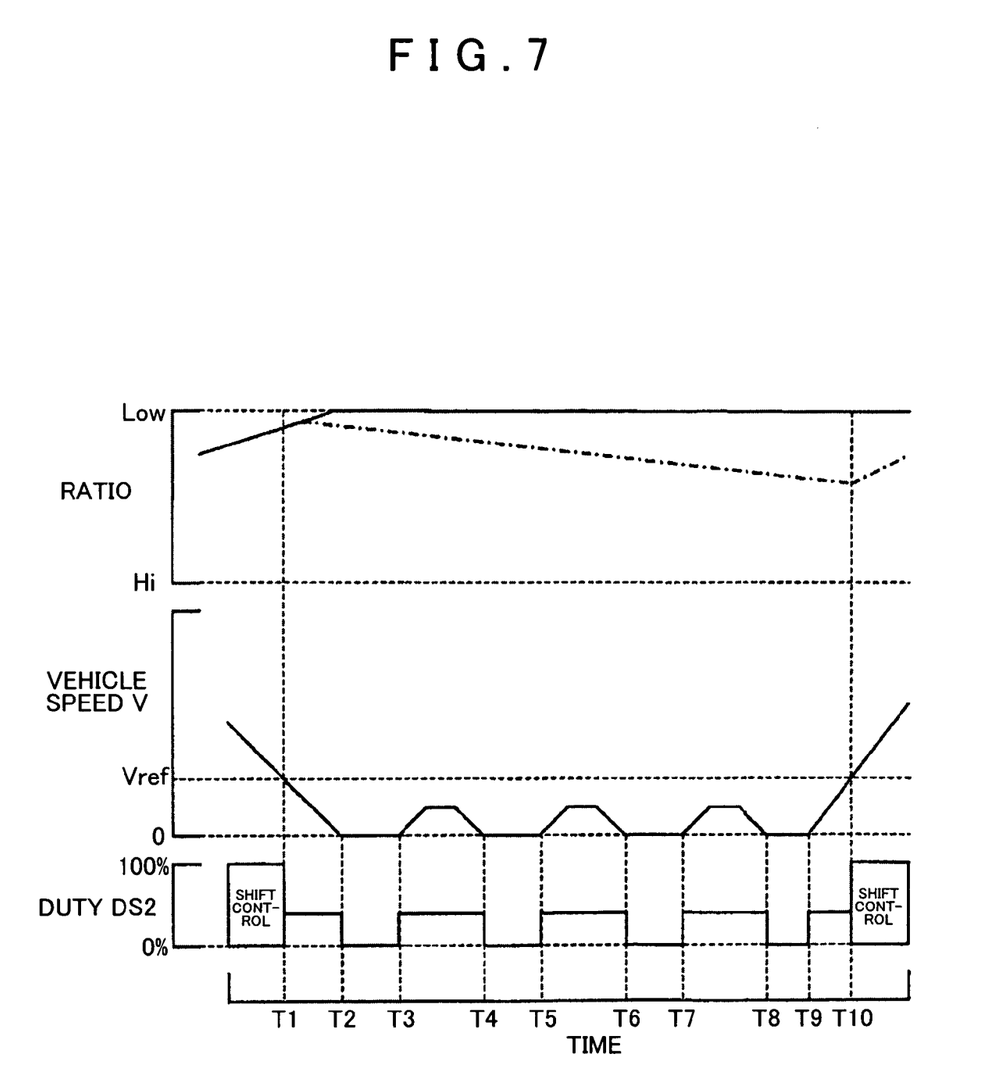
FIG. 7 is an explanatory drawing that schematically shows an example of temporal changes in the gear ratio of a continuously variable transmission 42, the vehicle speed V, and the duty DS2 of the duty solenoid 104, in the case where a belt return of the continuously variable transmission 42 is not determined when the vehicle speed V has become equal to or lower than a threshold value Vref.

FIG. 7 is an explanatory drawing that schematically shows an example of temporal changes in the gear ratio of the continuously variable transmission 42, the vehicle speed V, and the duty DS2 of the duty solenoid 104, in the case where a belt return of the continuously variable transmission 42 is not determined when the vehicle speed V has become equal to or lower than the threshold value Vref. In FIG. 7, the dashed-dotted line showing the gear ratio indicates a temporal change in the gear ratio in the case where, when the vehicle speed V has become equal to or lower than the threshold value Vref, the duty of both of the duty solenoids 102 and 104 is set to 0% until the vehicle speed V exceeds the threshold value Vref. Before the time T1, because the vehicle speed V is higher than the threshold value Vref, the CVTECU 60 performs the shift control of the continuously variable transmission 42. In other words, the CVTECU 60 performs the feedback control so that the number of revolutions Nin of the input shaft 38 becomes equal to the target revolution number Nin*. Between the time T1 and the time T2, because the value of the vehicle speed V is not "0", the value of the number of revolutions Nin is not "0", either. Thus, the duty DS1 of the duty solenoid 102 is set to 0%, whereas the duty DS2 of the duty solenoid 104 is set based on the input torque Tin and the oil temperature Toil, so that the continuously variable transmission 42 is shifted down. As a result, the continuously variable transmission 42 has a gear ratio that is close to the maximum reduction ratio. Between the time T2 and the time T3, because the value of the vehicle speed is "0", the value of the number of revolutions Nin of the input shaft 38 is also "0". Thus, the duty DS2 of the duty solenoid 104 is set to 0%, and the closing control is performed. After that, between the time T3 and the time T4, between the time T5 and the time T6, between the time T7 and the time T8, and between the time T9 and the time T10, because the value of the vehicle speed V is not "0", the value of the number of revolutions Nin of the input shaft 38 is not "0", either. Thus, the duty DS2 is set based on the input torque Tin and the oil temperature Toil, and the hydraulic pressure in the hydraulic actuator 44 is controlled to be P2 (i.e., at an intermediate pressure) shown in FIG. 4. Between the time T4 and the time T5, between the time T6 and the T7, and between the time T8 and the time T9, because the value of the vehicle speed V is "0", the value of the number of revolutions Nin of the input shaft 38 is also "0". Thus, the duty DS2 of the duty solenoid 104 is set to 0%, and the so-called closing control is performed. As explained above, according to the present embodiment, in accordance with the running and the stopping of the vehicle, the CVTECU 60 repeatedly performs the control to cause the hydraulic actuator 44 to have the intermediate pressure P2 by setting the duty DS2 based on the input torque Tin and the oil temperature Toil and the closing control. As a result, the continuously variable transmission 42 is inhibited from being shifted up due to a gradual increase in the hydraulic pressure in the hydraulic actuator 44 caused by the line pressure PL seeping to the hydraulic actuator 44 side through a small clearance in the spool 111 of the first flow rate control valve 110, as indicated by the dashed-dotted line showing the gear ratio at which only the closing control is performed. Thus, it is possible to ensure that the continuously variable transmission 42 has the maximum reduction ratio or has a gear ratio close to the maximum reduction ratio. As a result, it is possible to output a required driving force when the accelerator pedal 84 is depressed, and to start the vehicle even if the vehicle is on an uphill slope.

In the transmission device 40 according to the present embodiment as described above, in the case where a belt return of the continuously variable transmission 42 is not determined when the vehicle speed V has become equal to or lower than the threshold value Vref, by repeatedly performing the control to cause the hydraulic actuator 44 to have the intermediate pressure P2 by setting the duty DS2 of the duty solenoid 104 based on the input torque Tin and the oil temperature Toil and the closing control, in accordance with the running and the stopping of the vehicle, it is possible to inhibit the continuously variable transmission 42 from being shifted up due to a gradual increase in the hydraulic pressure in the hydraulic actuator 44 caused by the line pressure PL seeping to the hydraulic actuator 44 side through a small clearance in the spool 111 of the first flow rate control valve 110 and to allow the continuously variable transmission 42 to be shifted down. As a result, it is possible to output a required driving force when the accelerator pedal 84 is depressed, and to start the vehicle even if the vehicle is on an uphill slope. In addition, because the duty DS2 of the duty solenoid 104 is set based on the input torque Tin and the oil temperature Toil, it is possible to maintain the nip pressure of the belt 48 in accordance with the input torque Tin, and also to set the duty DS2 to be responsive to changes in the oil temperature Toil. Further, because the control is performed to cause the hydraulic actuator 44 to have the intermediate pressure P2 while the vehicle is running, it is possible to allow the continuously variable transmission 42 to be shifted down.

In the transmission device 40 according to the present embodiment, in the case where a belt return of the continuously variable transmission 42 is not determined when the vehicle speed V has become equal to or lower than the threshold value Vref, the control to cause the hydraulic actuator 44 to have the intermediate pressure P2 and the closing control are repeatedly performed in accordance with the running and the stopping of the vehicle. However, it is acceptable to have another arrangement in which, in the case where a belt return of the continuously variable transmission 42 is not determined when the vehicle speed V has become equal to or lower than the threshold value Vref, control is performed so as to cause the hydraulic actuator 44 to have the intermediate pressure P2 at all times, regardless of the running and the stopping of the vehicle.

In the transmission device 40 according to the present embodiment, in the case where a belt return of the continuously variable transmission 42 is not determined when the vehicle speed V has become equal to or lower than the threshold value Vref, the duty DS2 of the duty solenoid 104 is set based on the input torque Tin and the oil temperature Toil. However, it is acceptable to have another arrangement in which the duty DS2 of the duty solenoid 104 is set only based on the input torque Tin. It is also acceptable to have yet another arrangement in which the duty DS2 of the duty solenoid 104 is set only based on the oil temperature Toil. Further, it is acceptable to have yet another arrangement in which the duty DS2 of the duty solenoid 104 is set to a predetermined duty value (e.g., 40%), regardless of the input torque Tin and the oil temperature Toil.

In the transmission device 40 according to the present embodiment, in the case where a belt return of the continuously variable transmission 42 is determined when the vehicle speed V has become equal to or lower than the threshold value Vref, the duty DS2 of the duty solenoid 104 is set to the set value Dset (e.g., 70%, 80%, or the like) so that the oil is discharged from the hydraulic actuator 44. However, it is acceptable to have another arrangement in which, even in the case where a belt return of the continuously variable transmission 42 is determined when the vehicle speed V has become equal to or lower than the threshold value Vref, the CVTECU 60 repeatedly performs the control to cause the hydraulic actuator 44 to have the intermediate pressure P2 by setting the duty DS2 of the duty solenoid 104 based on the input torque Tin and the oil temperature Toil and the closing control, in accordance with the running and the stopping of the vehicle, like in the case where a belt return of the continuously variable transmission 42 is not determined.

Next, the correspondence relationships between the principal elements described in the exemplary embodiments and the principal elements of the present invention described in the section of the Summary of the Invention will be explained. In the present embodiment, the transmission device 40 is a non-limiting example of the "transmission device". The belt type continuously variable transmission 42 is a non-limiting example of the "continuously variable transmission". The duty solenoid 102, the duty solenoid 104, the first flow rate control valve 110, and the second flow rate control valve 120 that are included in the hydraulic circuit 50 are a non-limiting example of the "fluid supplying and discharging unit". The CVTECU 60 that performs, in the case where a belt return of the continuously variable transmission 42 is not determined when the vehicle speed V has become equal to or lower than the threshold value Vref, the hydraulic pressure control routine shown in FIG. 3 by repeatedly exercising the control to cause the hydraulic actuator 44 to have the intermediate pressure P2 by setting the duty DS2 of the duty solenoid 104 based on the input torque Tin and the oil temperature Toil and the closing control, in accordance with the running and the stopping of the vehicle are a non-limiting example of the "control unit". The duty solenoid 104 is a non-limiting example of the "discharging solenoid valve". In this situation, the "continuously variable transmission" is not limited to the belt type continuously variable transmission 42. It is acceptable to use any other type of continuously variable transmission. The "fluid supplying and discharging unit" is not limited to the duty solenoid 102, the duty solenoid 104, the first flow rate control valve 110, and the second flow rate control valve 120 that are included in the hydraulic circuit 50. It is acceptable to use any other device as long as the device is operable to supply and discharge a working fluid to and from a working fluid chamber in a continuously variable transmission that is installed in a vehicle and that is shifted up by supplying the working fluid to the working fluid chamber and that is shifted down by discharging the working fluid from the working fluid chamber. The "control unit" is not limited to the CVTECU 60. It is acceptable to have another arrangement in which the CVTECU 60, the engine ECU 26, and the main ECU 80 are integrally structured. It is acceptable to have yet another arrangement in which the CVTECU 60 is configured with a plurality of electronic control units. The "control unit" does not necessarily have to be configured such that, in the case where a belt return of the continuously variable transmission 42 is not determined when the vehicle speed V has become equal to or lower than the threshold value Vref, the control unit repeatedly performs the control to cause the hydraulic actuator 44 to have the intermediate pressure P2 by setting the duty DS2 of the duty solenoid 104 based on the input torque Tin and the oil temperature Toil and the closing control, in accordance with the running and the stopping of the vehicle. For example, it is acceptable to configure the control unit so as to perform control to cause the hydraulic actuator 44 to have the intermediate pressure P2 at all times, regardless of the running and the stopping of the vehicle. As another example, it is acceptable to configure the control unit so as to set the duty DS2 of the duty solenoid 104 regardless of the input torque Tin and the oil temperature Toil, while performing the control to cause the hydraulic actuator 44 to have the intermediate pressure P2. As yet another example, it is acceptable to configure the control unit so as to perform the control to cause the hydraulic actuator 44 to have the intermediate pressure P2, even if a belt return of the continuously variable transmission 42 is determined when the vehicle speed V has become equal to or lower than the threshold value Vref. In other words, it is acceptable to configure the control unit in any way as long as the it is operable to control the fluid supplying and discharging unit in such a manner that, while the vehicle is in a low-speed state in which the vehicle speed is equal to or lower than the predetermined speed, the pressure of the working fluid in the working fluid chamber is at an intermediate pressure that is lower than the pressure when the vehicle speed has reached the predetermined speed and is higher than the pressure when the working fluid has completely been discharged from the working fluid chamber. Note that the correspondence relationship between the principal elements described in the exemplary embodiments and the principal elements of the present invention described in the section of the Summary of the Invention is an example used for specifically explaining the preferred embodiment of the present invention described in the section of the Summary of the Invention through the exemplary embodiments. Thus, the elements of the present invention described in the section of the Summary of the Invention are not limited by the description of the correspondence relationship. In other words, the present invention described in the section of the Summary of the Invention should be interpreted based on the description in the same section. The exemplary embodiments merely serve as specific examples of the invention described in the section of the Summary of the Invention.

The preferred embodiment of the present invention has been explained above through the exemplary embodiments; however, the present invention is not at all limited to the exemplary embodiments described above. Needless to say, the present invention can be carried out in other various modes without departing from the gist of the present invention.

What is claimed is:

1. A transmission device comprising:
   a continuously variable transmission that is installed in a vehicle and that is shifted up by supplying a working fluid to a working fluid chamber and that is shifted down by discharging the working fluid from the working fluid chamber;
   a fluid supplying and discharging unit that supplies and discharges the working fluid to and from the working fluid chamber; and
   a control unit that controls the fluid supplying and discharging unit such that, while the vehicle is in a low-speed state in which a speed of the vehicle is equal to or lower than a predetermined speed, a pressure of the working fluid in the working fluid chamber is at an intermediate pressure that is lower than a pressure when the speed of the vehicle has reached the predetermined speed and that is higher than a pressure when the working fluid has been completely discharged from the working fluid chamber.

2. The transmission device according to claim 1, wherein the control unit controls the fluid supplying and discharging unit such that, while the vehicle is running in the low-speed state, the pressure of the working fluid in the working fluid chamber is reduced by discharging the working fluid from the working fluid chamber.

3. The transmission device according to claim 2, wherein the fluid supplying and discharging unit includes a discharging solenoid valve that functions in such a manner that the higher a duty ratio of an electric current applied thereto is, the more the discharging solenoid valve facilitates the discharging of the working fluid from the working fluid chamber, and
   the control unit controls the fluid supplying and discharging unit such that, while the vehicle is in the low-speed state, the electric current is applied to the discharging solenoid valve in such a manner that the larger a torque input to the continuously variable transmission is, the smaller the duty ratio is.

4. The transmission device according to claim 3, wherein the control unit controls the fluid supplying and discharging unit such that, in a case where a gear ratio of the continuously variable transmission is determined to be a maximum reduction ratio when the vehicle has come into the low-speed state, the working fluid is discharged from the working fluid chamber regardless of the pressure of the working fluid in the working fluid chamber.

5. The transmission device according to claim 2, wherein the fluid supplying and discharging unit includes a discharging solenoid valve that functions in such a manner that the higher a duty ratio of an electric current applied thereto is, the more the discharging solenoid valve facilitates the discharging of the working fluid from the working fluid chamber, and
   the control unit controls the fluid supplying and discharging unit such that, while the vehicle is in the low-speed state, the electric current is applied to the discharging solenoid valve in such a manner that the higher a temperature of the working fluid is, the smaller the duty ratio is.

6. The transmission device according to claim 2, wherein the control unit controls the fluid supplying and discharging unit such that, in a case where a gear ratio of the continuously variable transmission is determined to be a maximum reduction ratio when the vehicle has come into the low-speed state, the working fluid is discharged from the working fluid chamber regardless of the pressure of the working fluid in the working fluid chamber.

7. The transmission device according to claim 1, wherein the fluid supplying and discharging unit includes a discharging solenoid valve that functions in such a manner that the higher a duty ratio of an electric current applied thereto is, the more the discharging solenoid valve facilitates the discharging of the working fluid from the working fluid chamber, and
   the control unit controls the fluid supplying and discharging unit such that, while the vehicle is in the low-speed state, the electric current is applied to the discharging solenoid valve in such a manner that the larger a torque input to the continuously variable transmission is, the smaller the duty ratio is.

8. The transmission device according to claim 7, wherein the control unit controls the fluid supplying and discharging unit such that, in a case where a gear ratio of the continuously variable transmission is determined to be a maximum reduction ratio when the vehicle has come into the low-speed state, the working fluid is discharged from the working fluid chamber regardless of the pressure of the working fluid in the working fluid chamber.

9. The transmission device according to claim 1, wherein the fluid supplying and discharging unit includes a discharging solenoid valve that functions in such a manner that the higher a duty ratio of an electric current applied thereto is, the more the discharging solenoid valve facilitates the discharging of the working fluid from the working fluid chamber, and the control unit controls the fluid supplying and discharging unit such that, while the vehicle is in the low-speed state, the electric current is applied to the discharging solenoid valve in such a manner that the higher a temperature of the working fluid is, the smaller the duty ratio is.

10. The transmission device according to claim 9, wherein the control unit controls the fluid supplying and discharging unit such that, in a case where a gear ratio of the continuously variable transmission is determined to be a maximum reduction ratio when the vehicle has come into the low-speed state, the working fluid is discharged from the working fluid chamber regardless of the pressure of the working fluid in the working fluid chamber.

11. The transmission device according to claim 1, wherein the control unit controls the fluid supplying and discharging unit such that, in a case where a gear ratio of the continuously variable transmission is determined to be a maximum reduction ratio when the vehicle has come into the low-speed state, the working fluid is discharged from the working fluid chamber regardless of the pressure of the working fluid in the working fluid chamber.

12. A control method for a continuously variable transmission that is installed in a vehicle and that is shifted up by supplying a working fluid to a working fluid chamber and that is shifted down by discharging the working fluid from the working fluid chamber, the control method comprising:

controlling supply and discharge of the working fluid to and from the working fluid chamber such that, while the vehicle is in a low-speed state in which a speed of the vehicle is equal to or lower than a predetermined speed, a pressure of the working fluid in the working fluid chamber is at an intermediate pressure that is lower than a pressure when the speed of the vehicle has reached the predetermined speed and that is higher than a pressure when the working fluid has completely been discharged from the working fluid chamber.

\* \* \* \* \*